Feb. 26, 1957     O. H. SCHELDORF     2,782,637
APPARATUS FOR TESTING COMPRESSORS
Filed July 13, 1955
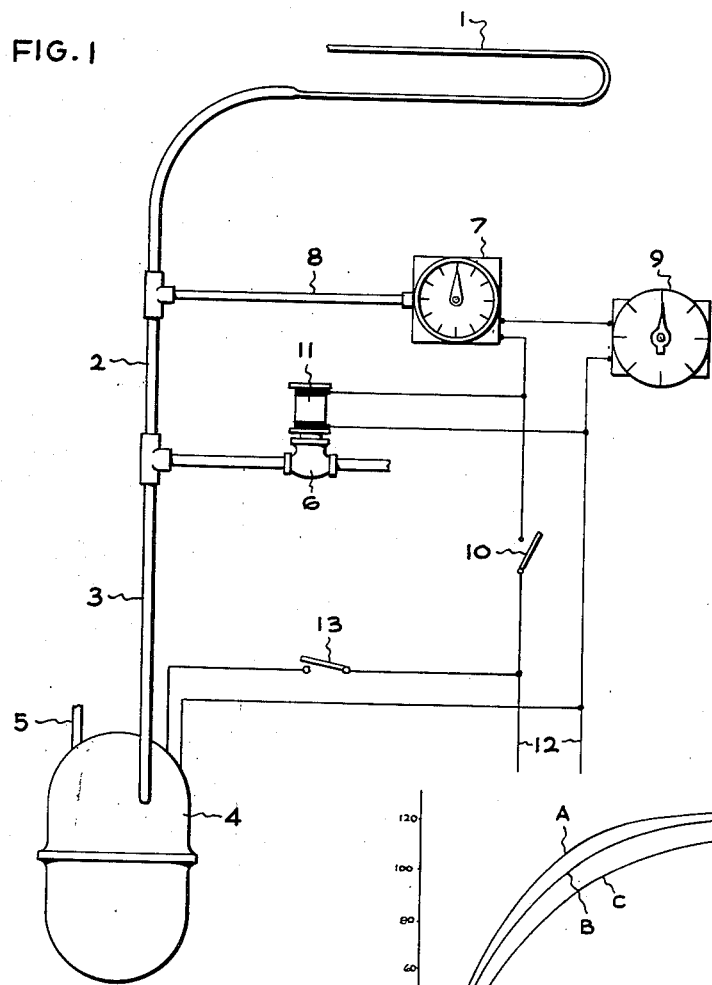
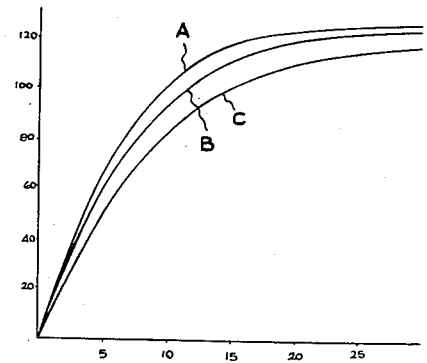
INVENTOR.
OWEN H. SCHELDORF
BY *Walter E. Rule*
HIS ATTORNEY

United States Patent Office 2,782,637
Patented Feb. 26, 1957

2,782,637

APPARATUS FOR TESTING COMPRESSORS

Owen H. Scheldorf, Fern Creek, Ky., assignor to General Electric Company, a corporation of New York Application July 13, 1955, Serial No. 521,735

2 Claims. (Cl. 73—168)

The present invention relates to apparatus for testing compressors, particularly refrigerant compressors such as those which are employed in the refrigeration system for household refrigerators.

Heretofore the factory testing of household refrigerator compressors consisted in reading on a pressure gauge the maximum pressure developed by the compressor against a fixed restrictor. The pressure reading was ordinarily taken when the pressure had become stabilized and as a net result the test for each compressor usually required from two to three minutes of running time for each compressor. This test was not only time consuming but also involved an accuracy problem in separating the acceptable compressors from the unacceptable since the usual pressure gauge capable of reading pressures from zero to 120 or more p. s. i. are normally calibrated in one pound increments and the spread of compressors in this range is normally small. As a difference of as little as one p. s. i. in the maximum pressure developed by a given compressor may represent the difference between an acceptable compressor and one which is not acceptable, it is obvious that such test procedures and apparatus are not completely satisfactory.

It is an object of the present invention to provide apparatus for quickly and accurately testing a compressor. The present invention is based in part on the discovery that the time required for a compressor to build up a given or predetermined discharge pressure against a fixed restrictor, which pressure is less than the maximum pressure developed by the compressor, is both a faster and more accurate measurement of the quality of the compressor than is the measure of maximum pressure developed by the compressor. Accordingly it is a further object of the invention to provide an improved apparatus in which the performance of a compressor is measured in terms of time required for the compressor discharge pressure to increase to a predetermined value against a fixed flow restriction.

Further objects and advantages of the invention will become apparent as the following description proceeds and the features of novelty which characterize the invention will be pointed out with particularity in the claims annexed to and forming part of the specification.

In carrying out the objects of the present invention, there is provided test equipment or apparatus comprising a fixed restrictor such as a capillary and means for connecting the restrictor to the compressor discharge conduit. The connecting means or line has connected thereto a normally closed pressure switch and a normally open solenoid operated relief valve which normally permits the compressor to operate against zero or a relatively low discharge back pressure. When the relief valve is closed, the compressor operates against the fixed restrictor or capillary and to provide means for measuring the time required for the compressor to build up a discharge pressure of a predetermined value after the valve is closed there is provided electrically-operated timing means, such as an electric clock, and an electric circuit for controlling the operation of the valve and for connecting the pressure switch in series with the clock. The closing of the switch in the electric circuit when the compressor is running serves to close the valve and start the clock. Opening of the pressure switch when the compressor discharge pressure increases to a predetermined value de-energizes the timing means. The running time of the clock is a measure of the performance of the compressor.

For a better understanding of this invention, reference may be had to the accompanying drawings in which:

Figure 1 is a somewhat schematic illustration of the apparatus employed in carrying out the present invention; and Fig. 2 is a plot of representative pressure-time curves of different compressors operated on the test system of the present invention.

Referring to the accompanying drawing there is shown a fixed restrictor or capillary 1 connected by a line 2 to the discharge conduit 3 of a hermetic compressor 4. During test of the compressor 4 the suction conduit 5 thereof is opened to the atmosphere. Also connected to the line 2 between the connection thereof to the compressor 4 and the capillary 1, is a side line including a solenoid operated valve 6 which also opens to the atmosphere. A pressure switch 7 is connected by a conduit 8 to the line 2 so that the operation of this switch is responsive to the pressures within the line 2. The pressure switch 7 is electrically connected in series with an electric timer or clock 9 and this circuit includes a manually operated switch 10 which also controls the circuit energizing the coil 11 effecting operation of the valve 6.

In the use of this test apparatus, a compressor 4 is first connected to the line 2 and to a power source 12 by the closing of a switch 13. During this initial operation of the compressor the switch 10 is open so that the circuits including the solenoid 11 and the clock 9 are de-energized. The air compressed by the compressor 4 and discharged through the discharge conduit 3 into the line 2 passes through the normally open valve 6 and is again discharged to the atmosphere so that the compressor is operating under a no-load condition, that is, with no restriction in the discharge line. The pressure gauge switch 7 is set at zero pressure and the electric timer 9 is similarily set at zero. The pressure gauge switch 7 includes electrical contacts (not shown) which are normally closed and which are opened when the pressure within the line 2 reaches a predetermined value.

With the compressor 4 operating against zero back pressure in the discharge line 2, the switch 10 is closed thereby energizing the solenoid 11 and the timer 9. Upon closing of the solenoid valve 6, pressure is built up in the system against the flow restriction of the capillary 1, the flow through the capillary 1 being, of course, a function of the pressure within the line 2. When the pressure in the system reaches a predetermined value at which the pressure gauge switch 7 is set, this switch opens stopping the timer 9.

The measure of the capacity of the compressor 4 is the time required for the compressor to build up the predetermined pressure against the restriction of the capillary 1. The starting time of the compressor is not involved as the compressor runs continuously. Whenever it is found necessary, the test may be repeated immediately merely by opening the switch 10 thereby releasing the pressure within the line 2 and re-setting the pressure gauge switch 7 and the timer 9 to zero settings.

As it has been previously indicated, the tests are conducted with the pressure gauge switch 7 set to de-energize the clock circuit when the pressure within the line 2 reaches a valve, which is somewhat below the maximum pressure which can be developed by the compressor 4.

For maximum accuracy, all of the lines or conduits such as 2 and 8 should be as short as possible so that the entire test system will have a relatively small volume as compared with the pumping rate of the compressor 4.

For a further understanding of the advantages of the present invention reference should be had to Figure 2 of the drawing in which is plotted the pressure-time curves of three compressors A, B and C. All three of these compressors were of the same type and tested on the same test equipment and were designed to produce a maximum discharge pressure somewhat in excess of 120 p. s. i.

From a consideration of these curves it will be noted that the pressure buildup for all three compressors during the initial few seconds of the test was substantially constant or linear and at the rate of approximately 10 pounds per second. However after the pressures reached about 60 p. s. i. the rate of build up of pressure against the fixed restrictor begins to decrease so that the slope of the curves gradually decrease. Also at this point, the curves tend to spread apart and this spread is greater with regards to the time axis than the pressure axis. For this reason and for the additional reason that a timer calibrated in seconds can be more easily and accurately read than a pressure gauge calibrated in five pounds major increments and one pound minor increments, it will be seen that time is not only a more accurate but also a more significant factor than pressure in sorting compressor samples.

In setting up the test, correlation tests are required to establish the reject level on a given test set up for a specific type of compressor, that is, the engineering specifications for capacity of a given type compressor are established as a part of the machine design and compressors with these known values are used in determining the comparative time-cycle values as attained on a given test set up and are used to establish the proper reject levels.

Preferably, the pressure gauge switch 7 is set to open the clock circuit at a pressure of from about 70 to 90% of the maximum pressure which can be developed in the test system by an average acceptable compressor. For example in the diagram shown in Figure 1, if the curve for compressor B be taken as the reject level curve for a type of compressor engineered to develop a maximum of about 125 p. s. i. against a given restrictor the pressure gauge switch 7 may be set to open within a range of pressures of from about 85 to 112 p. s. i. For example if the switch is set to open at 110 p. s. i. it will be noted that the reject level is approximately 15 seconds. Therefore any compressor which does not raise the pressure within the line 2 to this valve within 15 seconds is properly rejected. For example compressor A reaches pressure of 110 pounds within 12 seconds while compressor which required 20 seconds does not meet the standard and is therefore rejected.

These time differences of approximately three seconds between compressors A and B and five seconds between B and C can be accurately read from the usual electric timer. However it will be noted from Figure 2 that the pressure differences between the three compressors at the 15 second mark are relatively small particularly for the usual pressure gauge which measures pressure anywhere from zero for example 150 p. s. i.

The present test apparatus employing time as the significant test factor is particularly useful in testing and sorting compressors of the type mass produced for household refrigerators wherein economic considerations dictate the design of the refrigerating machine to closer specifications as affect the cost thereof. One of the principal advantages of the present test apparatus is in the separation of border-line compressors, that is compressors very close to the reject level and on either side thereof all of which will have approximately the same total pull down or maximum pull down if allowed to run long enough but which nevertheless would not give a satisfactory performance in a refrigerating system for a household refrigerator. In many household refrigerators now on the market a compressor which requires too much time for proper pull down is not acceptable even though its maximum pull down is high. For example in those systems where defrosting of the evaporator is accomplished between each operating cycle of the refrigerating system, it is more desirable to employ a compressor which cycles frequently for short periods of time and which quickly establishes the desired pressure differentials within the system rather than one which requires a relatively long running time to establish such pressures.

While the test procedure has been described as including initial operation of the compressor against a zero or atmospheric back discharge pressure, significant and useable results can also be obtained in a shorter time by initially connecting line 2 to a pressure tank as a source of a constant pressure within the range of pressure where the time-pressure curves are substantially linear, closing the connection when the clock is started and noting the time required for the compressor to build up the pressure in line 2 from the starting pressure to the predetermined test pressure.

While a specific embodiment of this invention has been shown and described, it is not intended that the invention be limited to the particular construction shown and described and it is intended by the appended claims to cover all modifications within the spirit and scope of the invention.

What I claim as new and desire to secure by Letters Patent of the United States is:

1. Compressor testing apparatus comprising a fixed restrictor, a line connecting said restrictor to the compressor discharge conduit, a normally closed pressure switch communicating with said line, a solenoid-operated relief valve connecting said line to a source of constant back pressure, a clock, an electric circuit controlling said valve and connecting said pressure switch in series with said clock, and a switch in said circuit for closing said valve and starting said clock, said pressure switch stopping said clock when the pressure built up in said line by said compressor increases to a predetermined value.

2. Compressor testing apparatus comprising a low volume system including fixed restrictor, a line connecting said restrictor to the compressor discharge conduit, a normally closed pressure switch communicating with said line, a normally open solenoid-operated relief valve connected to said line, a clock, an electric circuit controlling said valve and connecting said pressure switch in series with said clock, and a switch in said circuit for closing said valve and starting said clock, said pressure switch stopping said clock when the pressure built up in said line by said compressor increases to a predetermined value.

References Cited in the file of this patent

UNITED STATES PATENTS

| | | |
|---|---|---|
| 1,398,097 | Gibson | Nov. 22, 1921 |
| 2,062,173 | Haskins | Nov. 24, 1936 |
| 2,612,777 | Greer | Oct. 7, 1952 |